US008770540B2

(12) United States Patent
Christenbury et al.

(10) Patent No.: US 8,770,540 B2
(45) Date of Patent: Jul. 8, 2014

(54) DEVICE AND METHOD FOR MANUFACTURING TIRE TREAD FEATURES

(75) Inventors: Damon Christenbury, Fountain Inn, SC (US); Jonathan Jewell, Greenville, SC (US)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 157 days.

(21) Appl. No.: 13/318,618

(22) PCT Filed: Aug. 20, 2009

(86) PCT No.: PCT/US2009/054472
§ 371 (c)(1),
(2), (4) Date: Nov. 3, 2011

(87) PCT Pub. No.: WO2011/022013
PCT Pub. Date: Feb. 24, 2011

(65) Prior Publication Data
US 2012/0133082 A1 May 31, 2012

(51) Int. Cl.
*B22D 19/00* (2006.01)
*B29D 30/06* (2006.01)

(52) U.S. Cl.
USPC .............. 249/91; 164/334; 249/94; 425/28.1; 425/470

(58) Field of Classification Search
USPC .................. 249/91, 93, 94; 164/11, 112, 334; 425/28.1, 35, 470
See application file for complete search history.

(56) References Cited

U.S. PATENT DOCUMENTS

| 2,263,001 | A | | 11/1941 | Gunsaulus et al. |
| 2,593,547 | A | * | 4/1952 | Duerksen ...................... 164/333 |
| 2,771,114 | A | | 11/1956 | Labernie |
| 2,983,005 | A | * | 5/1961 | Spier .............................. 164/10 |
| 3,631,911 | A | | 1/1972 | Verdier |
| 4,023,268 | A | | 5/1977 | Momchilov |
| 4,471,200 | A | | 9/1984 | Takahashi |
| 4,576,559 | A | | 3/1986 | Yoda et al. |
| 6,263,934 | B1 | | 7/2001 | Auxerre et al. |
| 7,402,031 | B2 | | 7/2008 | Hyakutake et al. |

FOREIGN PATENT DOCUMENTS

| JP | 63-291704 | * 11/1988 |
| JP | 63-297107 | * 12/1988 |
| JP | 2003127618 | 5/2003 |
| JP | 2003236642 | 8/2003 |
| JP | 2006347468 | 12/2006 |
| JP | 2008-308093 | * 12/2008 |

OTHER PUBLICATIONS

PCT International Search Report for PCT/US2009/54472, Dated Oct. 8, 2009.

* cited by examiner

*Primary Examiner* — James Mackey
(74) *Attorney, Agent, or Firm* — Dority & Manning, P.A.

(57) ABSTRACT

A device and method for manufacturing features into the tread of a tire are provided. The device and method provide for manufacturing tread features of various shapes and sizes. The tread features may be recessed, protruding, or flush with respect to the surrounding tread surface. The device and method may be used for both new tire constructions as well as retreading operations.

7 Claims, 3 Drawing Sheets

DEVICE AND METHOD FOR MANUFACTURING TIRE TREAD FEATURES

FIELD OF THE INVENTION

The present invention relates to a device and method for manufacturing features into the tread of a tire and, more particularly, to a device and method that provide for manufacturing tread features of various shapes that may be recessed, protruding, or flush with respect to the surrounding tread surface. The present invention can be used for new tires as well as retreading operations.

BACKGROUND OF THE INVENTION

Tire tread patterns are available in a wide variety of designs and appearances and may include both aesthetic and functional features depending upon the intended application. Certain tread features may improve traction, braking, and performance in inclement weather conditions such as rain, snow, or ice. These and still other tread features may also provide ornamental aspects intended to be visually attractive to the buyer.

Various complexities are encountered in the process of converting a selected pattern or design into an actual tire tread that can be manufactured repeatedly. Ultimately, a mold must be created that will repeatedly duplicate the pattern on either the tread region of a tire or a tread belt in the case of retreading operations. For example, a mold may be constructed from a metal such as e.g., aluminum that has in turn been cast or injected from an intermediate mold—referred to as a mold negative—constructed from yet another material such as e.g., plaster or a machined metal part.

The creation and transfer of the desired pattern from drawings to mold negative to the final mold component is particularly problematic with certain types of tread features. For example, many tread features have a three-dimensional aspect i.e., changes in the rubber surface occurring in the radial directions (R) as well as in the axial and circumferential directions (C) of the tire. Multiple variations in three-dimensions are difficult to construct into a mold that will repeatedly duplicate the desired pattern into rubber, especially when an undercut in the radial direction of the tire is desired.

In addition, small grooves or slits—sometimes referred to as sipes—are frequently added to a tire tread to increase traction and/or provide certain visual effects. For certain applications, it may be desirable to have sipes forming a particular pattern and/or enclosing a particular rubber shape. For example, a circular sipe surrounding a rubber portion that in turn is recessed, flush, or protruding can provide certain tire performance advantages. However, construction of such tread features is difficult to provide with the conventional tire mold or molding process.

Accordingly, a device and method for manufacturing features into the tread pattern of a tire that addresses the difficulties identified above as well as other challenges would be useful and advantageous. A device and method that allows for the manufacture of various tread patterns having features that may be raised, recessed, or flush with the surrounding tread surface would also be particularly useful and advantageous.

SUMMARY OF THE INVENTION

Objects and advantages of the invention will be set forth in part in the following description, or may be obvious from the description, or may be learned through practice of the invention.

In one exemplary embodiment of the present invention, a device for molding features into the tread of a tire is provided. The device includes a sleeve formed in the shape of a selected tread feature. The sleeve defines a sleeve length and an interior having a sleeve interior width. An insert is provided that includes a cap and an extension. The extension is configured for mating receipt into the interior of the sleeve. The extension has a length that is less than the sleeve length. The cap is located adjacent to the extension and is positioned at an end of the insert. The cap is wider than the sleeve interior width so as to predetermine the amount of the insert that can be received into the sleeve.

Other variations of this exemplary embodiment may be used to provide still other embodiments of the present invention. For example, the sleeve may have a predetermined thickness so as to provide a tread feature having a sipe constructed with a width matching the predetermined thickness of the sleeve. The length of the extension can be selected so as to position the tread feature above, below, or flush with the surrounding surface height of the tire tread. The sleeve may include one or more apertures to provide for venting and capture of the sleeve as part of the process of creating the mold and the actual molding operation. The sleeve may include a rib attached to the exterior of the sleeve to prevent or minimize flashing of the aluminum or other fluid material when loaded against the sleeve to create a mold element. The sleeve may be constructed in a variety of shapes. In one exemplary embodiment, the sleeve is substantially cylindrical in shape so as to create a tubular tread feature.

In another exemplary aspect of the present invention, a process for molding features into the tread of a tire is provided. This method includes creating an aperture in a mold element, providing a molding device, and placing the molding device into the aperture of the mold element. The molding device includes a sleeve formed in the shape of a selected tread feature and an insert received into the sleeve. A material is loaded, in a fluid state, against the mold element and the molding device. The material is allowed to harden. The mold element is then separated from the hardened material. The insert is removed from the sleeve while leaving the sleeve positioned in the hardened material. The sleeve is used to form the selected tread feature in the tread of a tire.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
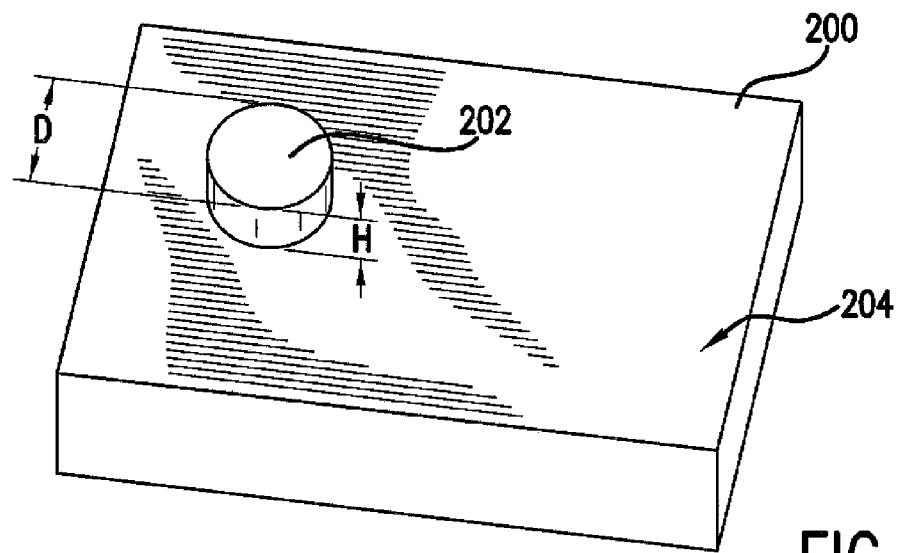
FIG. 1 illustrates a perspective view of an example of a mold element used in an exemplary method of the present invention.

The present invention relates to a device and method for manufacturing features into the tread of a tire and, more particularly, to a device and method that provide for manufacturing tread features of various shapes that may be recessed, protruding, or flush with respect to the surrounding tread surface. The present invention can be used for new tires as well as retreading operations.

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents. For example, in the description that follows, exemplary embodiments of the present invention will be described in conjunction with an exemplary molding process. Using the teaching disclosed herein, however, it will be understood by one of ordinary skill in the art that other exemplary molding devices of different shapes providing different tread features applied using different methods are within the scope of the present invention and claims that follow.

Figure 5A:
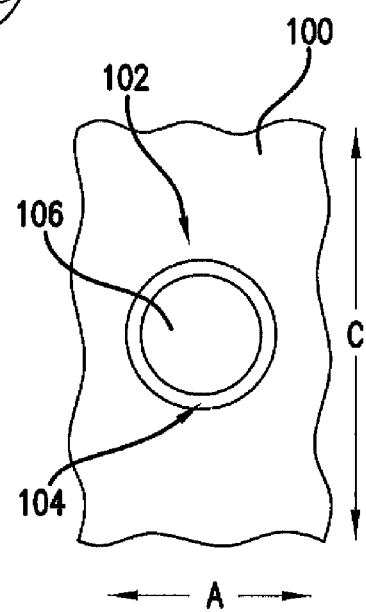
FIGS. 5A and 5B illustrate a cross-section view of a portion of a tread pattern having an exemplary tread feature as may be manufactured using the exemplary mold element of FIG. 2A and the exemplary method of the present invention illustrated in the preceding figures.
Figure 5B:
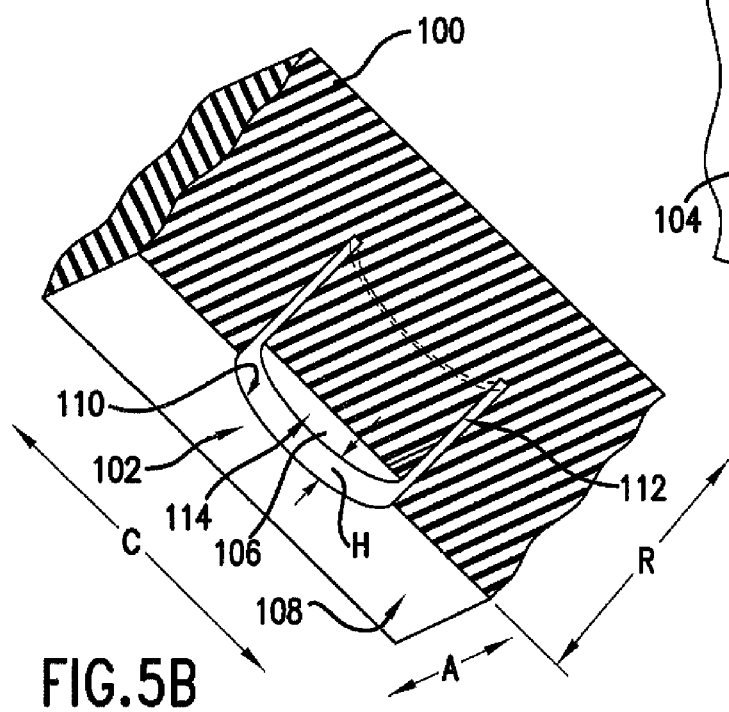

FIGS. 5A and 5B illustrate portions of a tread 100 that will be used to describe an exemplary embodiment of the present invention. Tread 100 includes a tubular tread feature 102 constructed from a circular or cylindrical sipe 104 surrounding a stud 106. As best seen in the cross section of FIG. 5B, stud 106 is recessed by an amount H with respect to the surrounding surface 108 of the tread 100.

Stud 106 is illustrated as a smooth cylinder providing a tubular sipe within tread 100. However, using the teachings disclosed herein, one or ordinary skill in the art will understand that the present invention can also be applied to tread features of other shapes and sizes as well. For example, sipe 104 may be non-circular in shape and could be e.g., elliptical, square, star-shaped or otherwise as desired. Additionally, instead of smooth surfaces 110 or 112, the surfaces of sipe 104 could have undulations, waves, or other shapes. By way of further example, stud 106 could also protrude from the surrounding surface 108 of tread 100 rather than being recessed as shown in FIG. 5A. Alternatively, stud 106 could be constructed flush with the surrounding surface 108. Features such as a pattern or identifying trademark can also be manufactured onto surface 114 of stud 106. These and other variations are within the scope of the present invention.

Turning now to FIG. 1, in order to construct a mold for creating tread feature 102, an exemplary method of the present invention will now be described. For purposes of focusing on the details of the present invention, only a portion of the mold elements will be shown in the figures—it being understood that in the context of a full tire tread mold that various other features and surfaces could be provided. Accordingly, a first mold element 200 (a mold positive) is constructed having a pin 202 protruding from the surface 204 of the mold element. Pin 202 is selected to have a diameter D and height H determined from the diameter and depth H desired for sipe 104 (FIGS. 5A and 5B). By way of example, mold element 200 could be manufactured from a resin that is readily machined, carved, or otherwise formed into the desired shape.

Figure 2A:
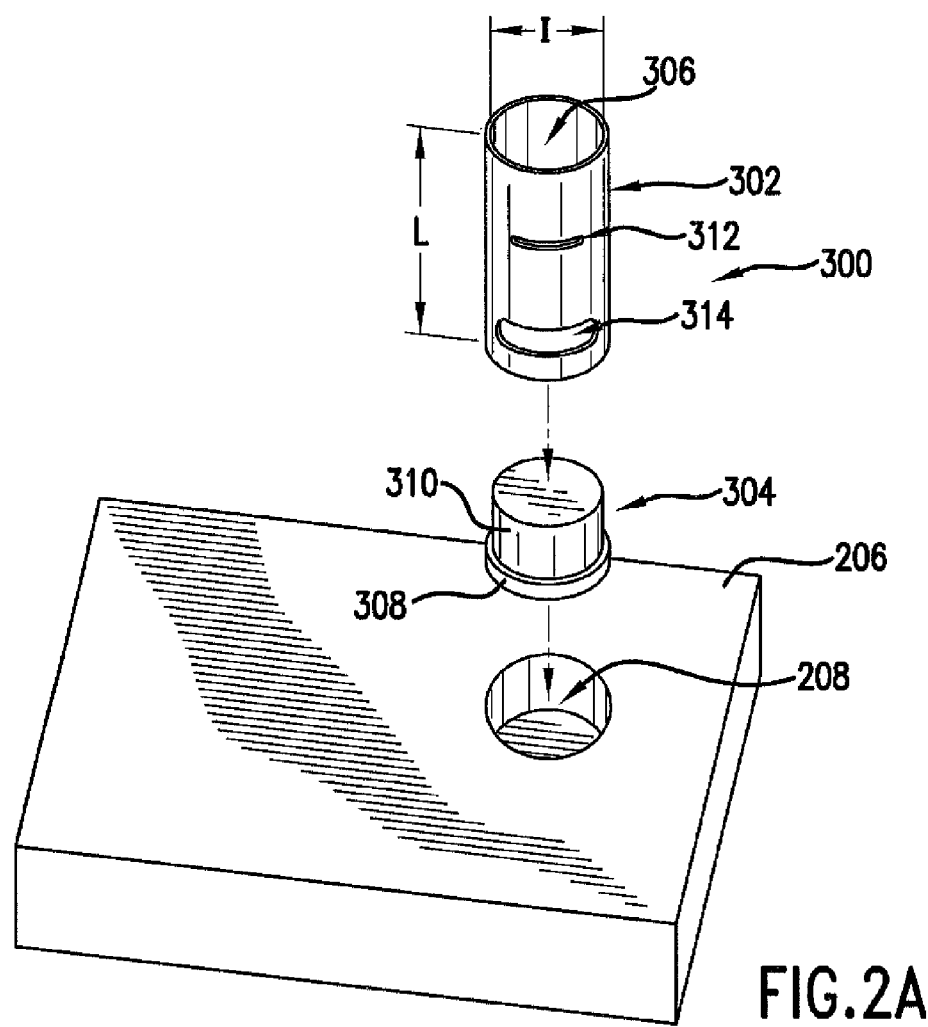
FIG. 2A illustrates a perspective view of an exemplary mold element and an exploded view of an exemplary molding device used in an exemplary method of the present invention.

First mold element 200 is then used to create second mold element 206 as shown in FIG. 2A. More specifically, by loading a fluid material into a mold cavity containing first mold element 200, second mold element 206 is formed with an aperture 208. By way of example, second mold element 206 could be formed by pouring a silicone based elastomer into a mold containing first mold element 200 and then allowing the elastomer to harden into the flexible, second mold element 206.

Next, molding device 300 is inserted into the aperture 208 of second mold element 206. Molding device 300 is constructed from a sleeve 302 and an insert 304. Sleeve 302 is constructed in the shape of the selected or desired tread feature 102 (FIGS. 5A and 5B), which in this case is cylindrical or tubular in overall shape. The thickness of sleeve 302 determines the thickness or width of sipe 104 (FIG. 5A). As shown in FIG. 2, sleeve 302 defines a sleeve length L and an interior 306 having an inside or sleeve interior width I. Insert 304 includes a cap 308 and an extension 310. Cap 308 is located adjacent to the extension 310 and is positioned at one end of the insert 304. Cap 308 is slightly wider than the sleeve interior width I, which delimits the amount by which insert 304 can be received into sleeve 302.

Figure 2B:
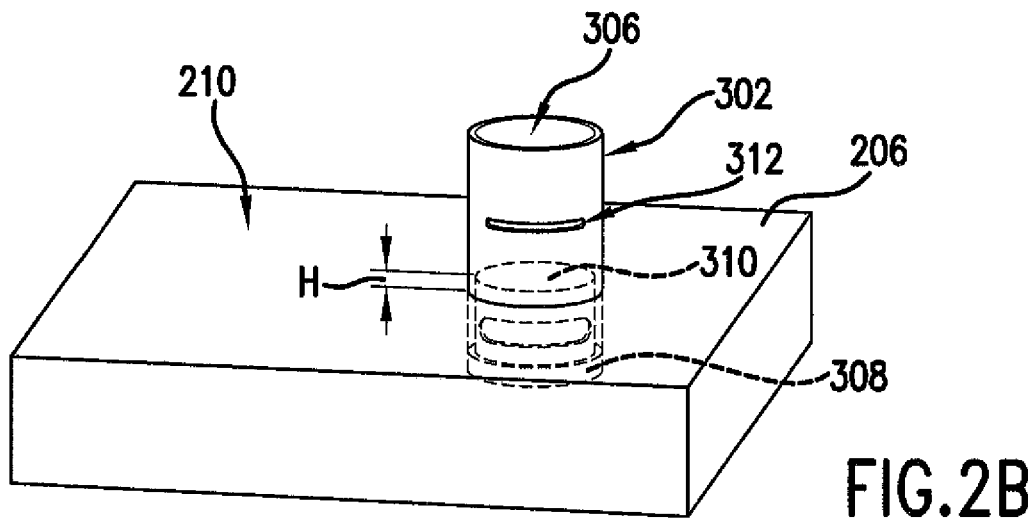
FIG. 2B provides a perspective view of the exemplary mold element of FIG. 2A with the exemplary molding device positioned therein.

As indicated by the directional arrows in FIG. 2A and as shown in a final position in FIG. 2B, in order to create molding device 300, extension 310 is received in a mating or complementary fashion into the interior 306 of sleeve 302. Molding device 300 is then placed into the aperture 208 of second mold element 206 with the end containing cap 308 being inserted first into the aperture 208. Relative to cap 308, aperture 208 is of a size that will hold cap 308 securely but not in a manner that would prevent removal of cap 308.

Continuing with FIG. 2B, it should be noted that the height H represents the amount by which extension 310 projects above the surface 210. In turn, height H controls the amount by which stud 106 is recessed below the surrounding surface 108 of the tread 100 (FIG. 5B). More specifically, height H is determined by the length of extension 310 relative to the depth of aperture 208. By way of example, if desired, stud 106 can also protrude from the surrounding surface 108 of tread 100. In such case, extension 310 would be located below the surface 210 of second mold element 206 by the amount desired for such a protrusion. Similarly, a stud 106 that was flush with the surrounding surface 108 of tread 100 would require an extension 310 that was flush or level with the surface 210 of second mold element 206.

Figure 3:
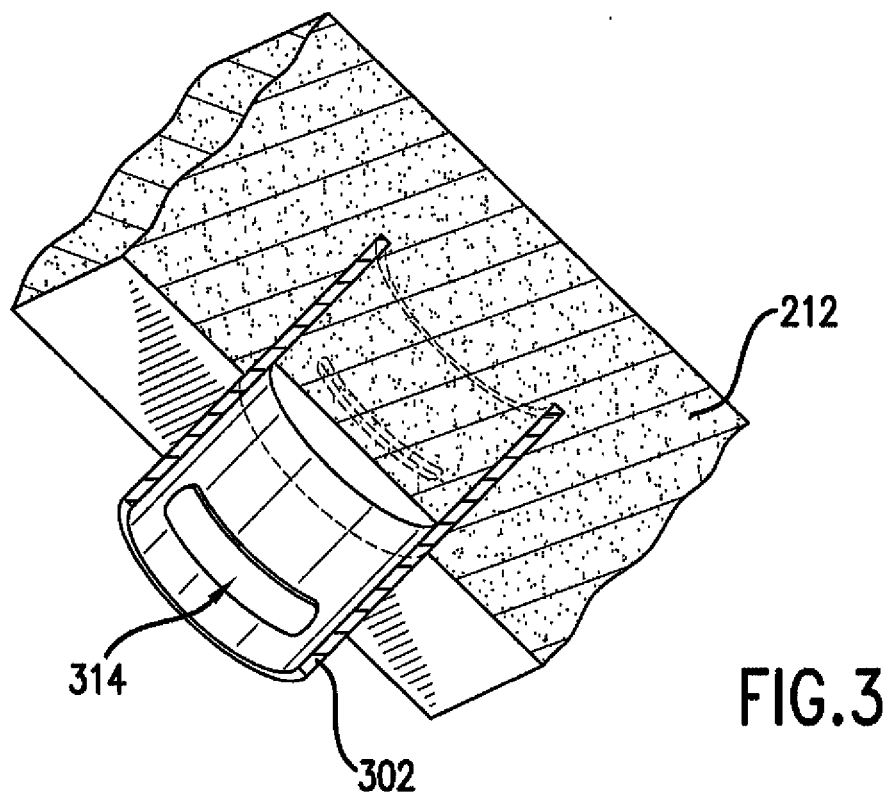
FIG. 3 provides a cross-section view of another exemplary mold element with one portion of an exemplary molding device of the present invention embedded therein.

After positioning molding device 300 into the aperture 208, another material is then loaded in a fluid state against second mold element 206 and molding device 300. For example, second mold element 206 can be placed into a mold cavity and liquid plaster or a plaster-based material poured into the mold cavity. Upon drying into a hardened material, the plaster will capture the sleeve 302 of molding device 300 to create a third mold element 212. More specifically, upon allowing the plaster to harden and separating the second mold element 206 from the hardened material, a third mold element 212 is created as shown in FIG. 3. Importantly, because of the tight fit with cap 308, the separation of second mold element 206 from the hardened material of third mold element 212 has also removed cap 308 from sleeve 302 while simultaneously leaving sleeve 302 positioned in third mold element 212. If desired, cap 308 can be removed from second mold element 206 and reused in another molding operation.

Figure 4:
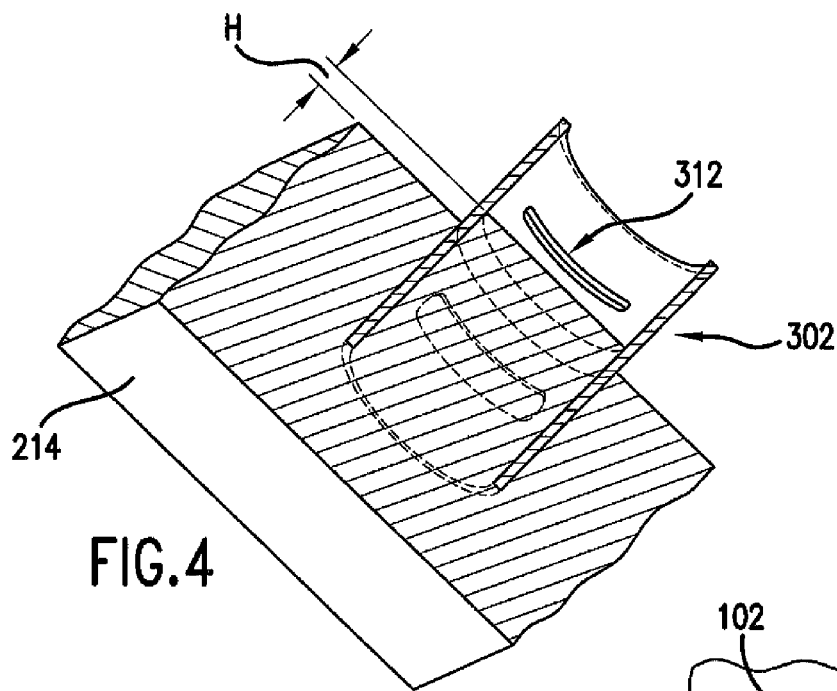
FIG. 4 provides a cross-section view of still another exemplary mold element with one portion of an exemplary molding device of the present invention embedded therein.

After removal of the cap 308 as described, still another material is now loaded in a fluid state against third mold element 212. By way of example, third mold element 212 can be placed into a mold cavity and molten aluminum loaded against third mold element 212. Upon solidifying the molten aluminum and removing the third mold element 212, the fourth and final mold element 214 is created as shown in FIG. 4. Apertures 314 in sleeve 302 facilitate the capture of sleeve 302 by the hardened aluminum. Upon removing the plaster of third mold element 212, sleeve 302 will separate form the plaster and remain in the hardened aluminum as part of the final mold element 214 shown in FIG. 4. As will be understood by one of ordinary skill in the art using the teachings disclosed herein, the final mold element 214 can now be used in a tread press or comparable device to created tread feature 102 of tread 100 as shown in FIGS. 5A and 5B. Aperture 312 provides for venting of the interior 306 during the tread molding process. A rib (not shown) can also be added to the exterior of sleeve 302, if desired, to help control flashing of the aluminum of other molten metal when loaded against sleeve 302.

As stated, the above molding process is provided by way of example only. Molding device 300 or other exemplary devices according to the present invention may be used in other molding processes as well. For example, molding device 300 could be inserted directly into a steel mold negative to which another metal such as molten aluminum will be applied. In such case, removal of the mold negative after the hardening of the molten metal can be used to remove the insert 304 from the interior 306 of the molding device 300. Alternatively, insert 304 can be manually removed after hardening of the molten metal and separate of the mold negative. This will leave the sleeve in the now hardened aluminum to provide the final mold element for creating tread feature 102. Using the teachings disclosed herein, one of ordinary skill in the art will understand that still other steps may be used or modified to provide molding processes within the spirit and scope of the present invention.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A device for molding features into the tread of a tire, comprising:
    a sleeve formed in the shape of a selected tread feature, said sleeve defining a sleeve length and an interior having a sleeve interior width;
    an insert comprising a cap and an extension, the extension configured for mating receipt into the interior of said sleeve, the extension having a length that is less than the sleeve length, the cap located adjacent to the extension and positioned at an end of said insert, the cap being wider than the sleeve interior width so as to predetermine the amount of said insert that can be received into said sleeve.

2. A device for molding features into the tread of a tire as in claim 1, wherein said sleeve has a predetermined thickness and the tread feature comprises a sipe having a width matching the predetermined thickness of said sleeve.

3. A device for molding features into the tread of a tire as in claim 1, the tire having a surrounding surface height, and wherein the length of the extension positions the tread feature above the surrounding surface height.

4. A device for molding features into the tread of a tire as in claim 1, the tire having a surrounding surface height, and wherein the length of the extension positions the tread feature below the surrounding surface height.

5. A device for molding features into the tread of a tire as in claim 1, the sleeve further comprising at least one aperture connected to the interior of the sleeve.

6. A device for molding features into the tread of a tire as in claim 1, the sleeve further comprising at least one rib attached to an exterior of the sleeve.

7. A device for molding features into the tread of a tire as in claim 1, wherein the sleeve is substantially cylindrical in shape so as to create a tubular tread feature.

\* \* \* \* \*